United States Patent [19]

Chung et al.

[11] Patent Number: 5,086,405
[45] Date of Patent: Feb. 4, 1992

[54] FLOATING POINT ADDER CIRCUIT USING NEURAL NETWORK

[75] Inventors: Ho-sun Chung; Seung-yeob Paek, both of Taegu, Rep. of Korea

[73] Assignee: Samsung Electronics Co., Ltd., Kyunggi, Rep. of Korea

[21] Appl. No.: 550,450

[22] Filed: Jul. 10, 1990

[30] Foreign Application Priority Data

Apr. 3, 1990 [KR] Rep. of Korea .............. 90-4517

[51] Int. Cl.⁵ .................................. G06F 7/50
[52] U.S. Cl. ............................ 364/748; 364/786; 340/146.2
[58] Field of Search ................ 364/748, 786; 340/146.2

[56] References Cited

U.S. PATENT DOCUMENTS

| | | | |
|---|---|---|---|
| 4,891,782 | 1/1990 | Johnson | 364/786 |
| 4,994,996 | 2/1991 | Fossum et al. | 364/748 |
| 4,999,803 | 3/1991 | Turrini et al. | 364/748 |
| 5,016,211 | 5/1991 | Jeong | 364/786 |

*Primary Examiner*—David H. Malzahn
*Attorney, Agent, or Firm*—Cushman, Darby & Cushman

[57] ABSTRACT

A floating point adder circuit using neural network concepts and having high speed operation is obtained by a controlling circuit using a comparator and an operating circuit using an adder and a subtractor.

7 Claims, 4 Drawing Sheets

FLOATING POINT ADDER CIRCUIT USING NEURAL NETWORK

FIELD OF THE INVENTION

The present invention relates to an adder circuit and, particularly, to a floating point adder circuit using neural network concepts to improve the processing speed.

BACKGROUND OF THE INVENTION

In the representation of numerical data, a floating point representation can reduce the numbers of digits presented, that is, the order more than a fixed point representation and, in case of representing the bit of same number, the larger integer or the smaller decimal can be represented. Also, the floating point representation occupies a small space of memory unit, is easy to process and move within a central processing unit, and can improve the accuracy of the data representation with a limited number of bits.

The input data form of an adder circuit using the floating point representation consists of a mantissa sign bit, an exponent bit, and a mantissa bit, and an initial decimal point is fixed just in front of the first bit of mantissa.

The representative method of an exponent uses the type which adds a biased value to the value which is to be represented, and the representative method of a mantissa uses the type of a sign and absolute value.

Considering an operating principle of a K-bit floating point adder circuit, first the exponent magnitude of the two numbers is equalized by comparing the exponent magnitude of the two numbers which is to be added and shifting the mantissa of the number having the smaller exponent to the number of digits that equals the difference of the two exponents.

Then, the mantissa parts of the two numbers whose exponent magnitude is equalized, are added to become a mantissa output, and, however, the mantissa output is normalized by shifting the maximum effective bit of the mantissa output to the first bit position of the mantissa.

On the other hand, the exponent output is the value which adds the carry that is generated when the mantissa signs of the two numbers are same and the exponent whose magnitude is larger at the input, and subtracts the reduced value of the exponent which is generated in the normalization.

The processing speed of a floating point adder circuit becomes a very important problem when using an adder circuit of the above floating point representation in applications which requires high transform speed, such as real time image signal processing or phonetic signal processing.

SUMMARY OF THE INVENTION

It is an object of the present invention to provide a floating point adder circuit whose processing speed is very high.

To accomplish the object, in a floating point adder circuit which adds the two binary numbers of K-bit, that is, M+N bit that consist of the M-bit exponent part and the N-bit mantissa part, the present invention is characterized by a comparator for comparing the exponent magnitude of the two binary numbers by providing first input synapses for connecting a first power supply voltage to a line as the connecting strength of the weight of each bit according to a first exponent value of the M-bit exponent part; second input synapses for connecting a second power supply voltage to the line as the connecting strength of the weight of each bit according to a second exponent value of the M-bit exponent part; and a neuron which is stimulated or restrained according to the difference of the connecting strength between the first power supply voltage and the second power supply voltage that are connected to the line;

an adder which adds the mantissa parts of the two binary numbers by providing input synapses for respectively connecting the second power supply voltage to a first line of N+1 numbers as the connecting strength of the weight of each bit according to a first mantissa value of the N-bit, a second mantissa value of the N-bit and a carry input of onebit; first bias synapses for connecting the first power supply voltage to each first line as the connecting strength of a multiple of the input connecting strength sum; feedback synapses for connecting the second power supply voltage to a second line of N+1 numbers of each lower output bit as the connecting strength of the weight of upper output bit; second bias synapses for connecting the first power supply voltage to the least significant bit line among the second lines as the connecting strength which subtracts 0.5 from the connecting strength of the first bias synapse and to the other lines as the connecting strength which subtracts the weight of the lower bit from the connecting strength of each lower bit line, in order to bias each second line connected to the feedback synapses; neurons which are stimulated or restrained by comparing the difference of the connecting strength of the first power supply voltage and the second power supply voltage which are respectively connected to the first line and the second line; and inverters for inverting the output of each neuron; and a subtractor comprising the adder and inverters for inverting some mantissa value of the N-bit and the carry input.

The objects and features of the present invention will become more readily apparent in the following description of the drawings.

DESCRIPTION OF THE PREFERRED EMBODIMENTS OF THE INVENTION

Figure 1:
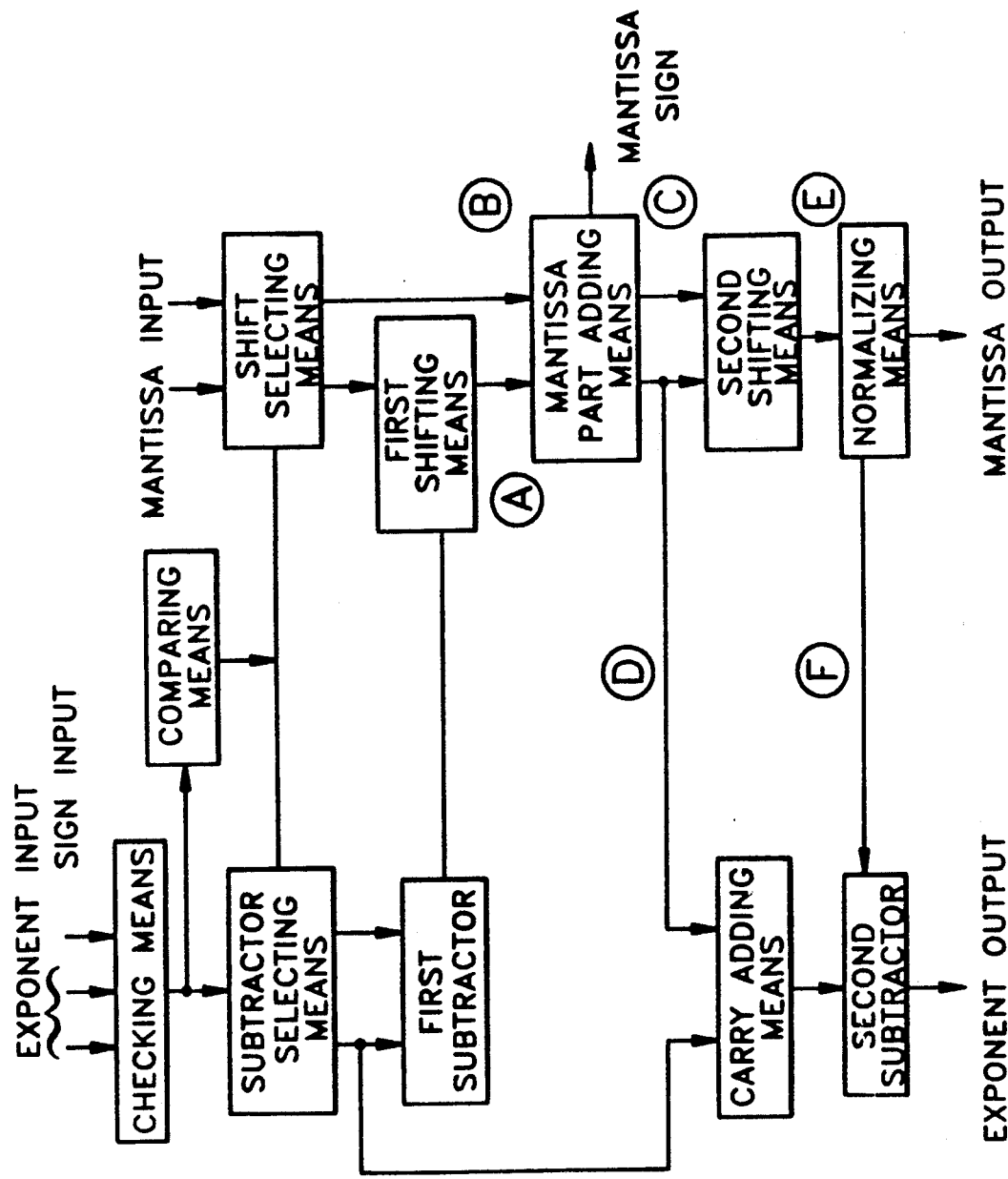
FIG. 1 is a block diagram of a general floating point adder circuit.

FIG. 1 is a block diagram of a general floating point adder circuit and includes a checking means 1 which changes the value of the exponent part into the lowest value in order to avoid an exponent adjustment in case that an adding number is 0;

a comparing means 2 for comparing the magnitudes of two exponents passing the checking means 1;

a subtractor selecting means 3 which inputs the larger exponent into the minuend input of a first subtracting means 4 and inputs the smaller exponent into the subtrahend input of the first subtracting means 4 by using an output of the comparing means 2 as a controlling signal;

a shift selecting means 5 which inputs the mantissa part of the smaller exponent into a first shifting means 6 and inputs the mantissa part of the larger exponent into a mantissa part adding means 7 by using the output of the comparing means 2 as a controlling signal; after inputting and adding the output of the first subtracting means 4 passing the first shifting means 6, that is, the mantissa shifted as many as the difference of two exponents into the mantissa adding means 7, if a carry is generated, the carry inputs into a carry adding means 8;

a second shifting means 9 which shifts the mantissa output of the mantissa part adding means 7 to the right by one-bit;

a normalizing means 10 which normalizes the output of the second shifting means 9; and a second subtracting means 11 which subtracts that output of the carry adding means 8 as many as the number of times shifting the mantissa part in the normalizing means 10 to the left after inputting and adding the larger exponent among the inputs of the first subtracting means 4 into the carry adding means 8.

At this time, the output of the normalizing means 10 becomes a mantissa output and the output of the second subtracting means 11 becomes an exponent output, and the most significant bit, that is, MSB among the output bits of the second subtracting means 11 represents an overflow of exponent. Also, the most significant bit outputted from the mantissa part adding means 7 becomes a mantissa sign output and the mantissa sign output is inverted if the carry is generated.

Figure 2:
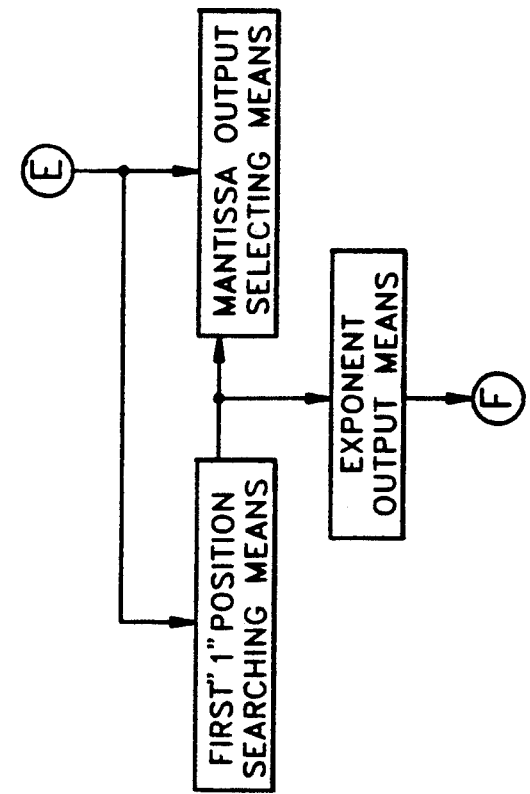
FIG. 2 is a block diagram of a normalization means of FIG. 1.

FIG. 2, which is a block diagram of a normalizing means of FIG. 1, plays a role in dividing the output of the second shifting means into the most effective mantissa part and the exponent part.

The normalizing means is composed of a first "1" position searching means 10A which outputs "1" only at the position corresponding to a bit that forwards "1" before other bits, and outputs "1" only at the next output of the output bit of the second shifting means 9 (FIG. 1) without the value of 1 by inputting the output of the second shifting means;

a mantissa output selecting means 10B which positions the bit that forwards 1 before other bits to the most significant bit by using the output of the first "1" position searching means 10A as a controlling signal; and an exponent output means 10C which outputs the exponent value of fixed bit by inputting the output of the first "1" position searching means 10A.

At this time, the output of the mantissa output selecting means 10B becomes the final mantissa output.

Figure 3:
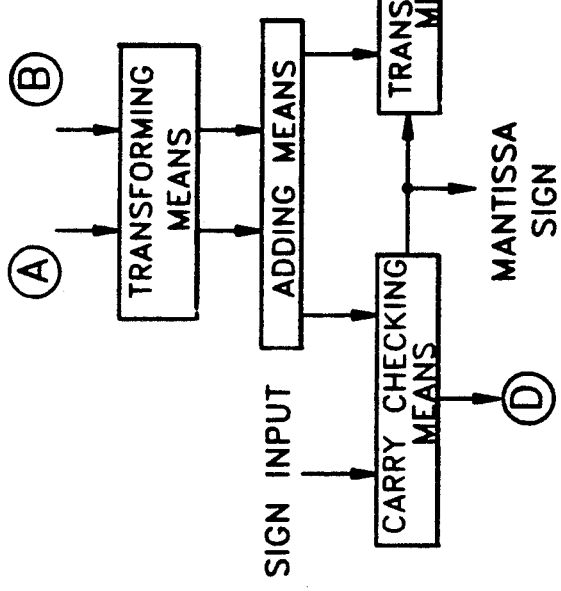
FIG. 3 is a block diagram of a mantissa part adding means of FIG. 1.

FIG. 3, which is a block diagram of a mantissa part adding means of FIG. 1, plays a role in adding two mantissa parts exponent-adjusted.

The mantissa adding means for adding by means of 2's complement because the mantissa part representing type is the sign and absolute value type, is composed of a transforming means 7A which transforms the input of the mantissa part adding means 7 into 2's complement;

an adding means 7B which adds and outputs an input transformed into 2's complement form through the transforming means 7A;

a carry checking means 7C which generates a carry by comparing the sign bits of two mantissa inputs with the output mantissa sign of the adding means 7B; and a carry adding means 7D which transforms the mantissa part output into the sign and absolute value representing type by adding one-bit when the output of the adding means 7B is negative, wherein the carry checking means 7C inverts and outputs the output mantissa sign when a carry is generated.

Figure 4:
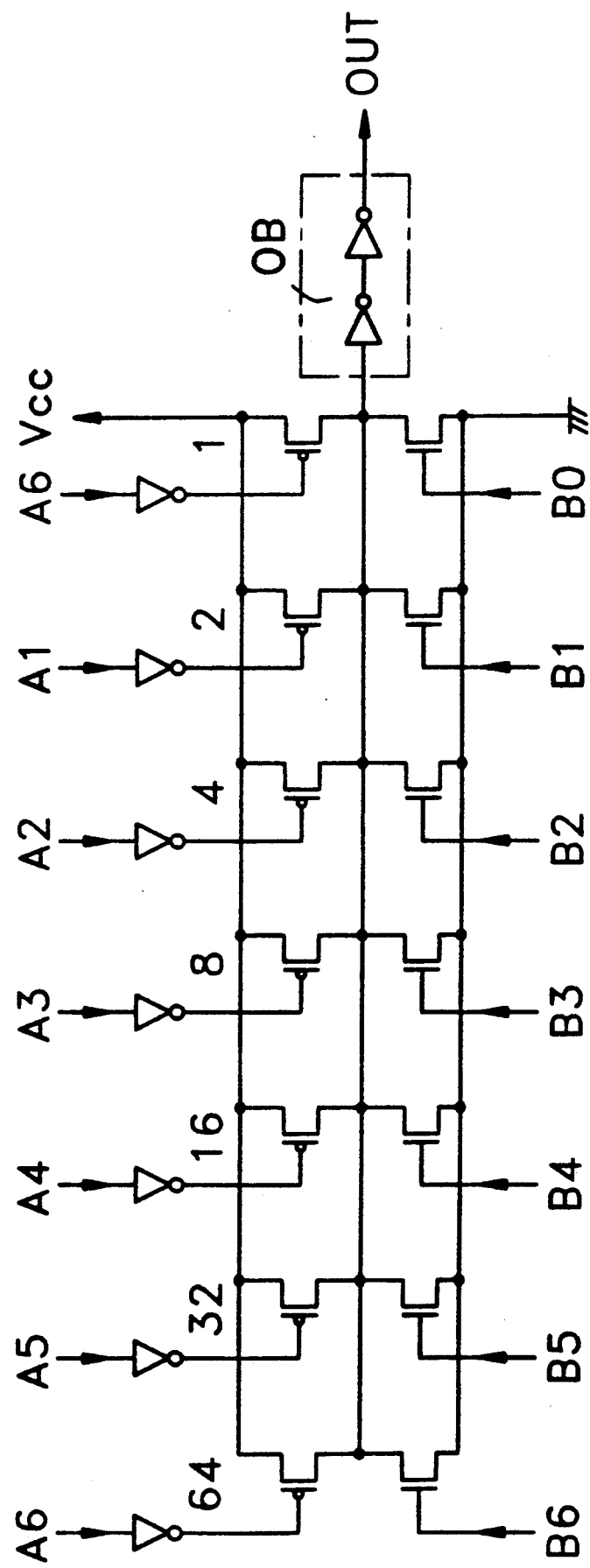
FIG. 4 is a circuit diagram showing one embodiment of a 7-bit comparator by the present invention.
Figure 5:
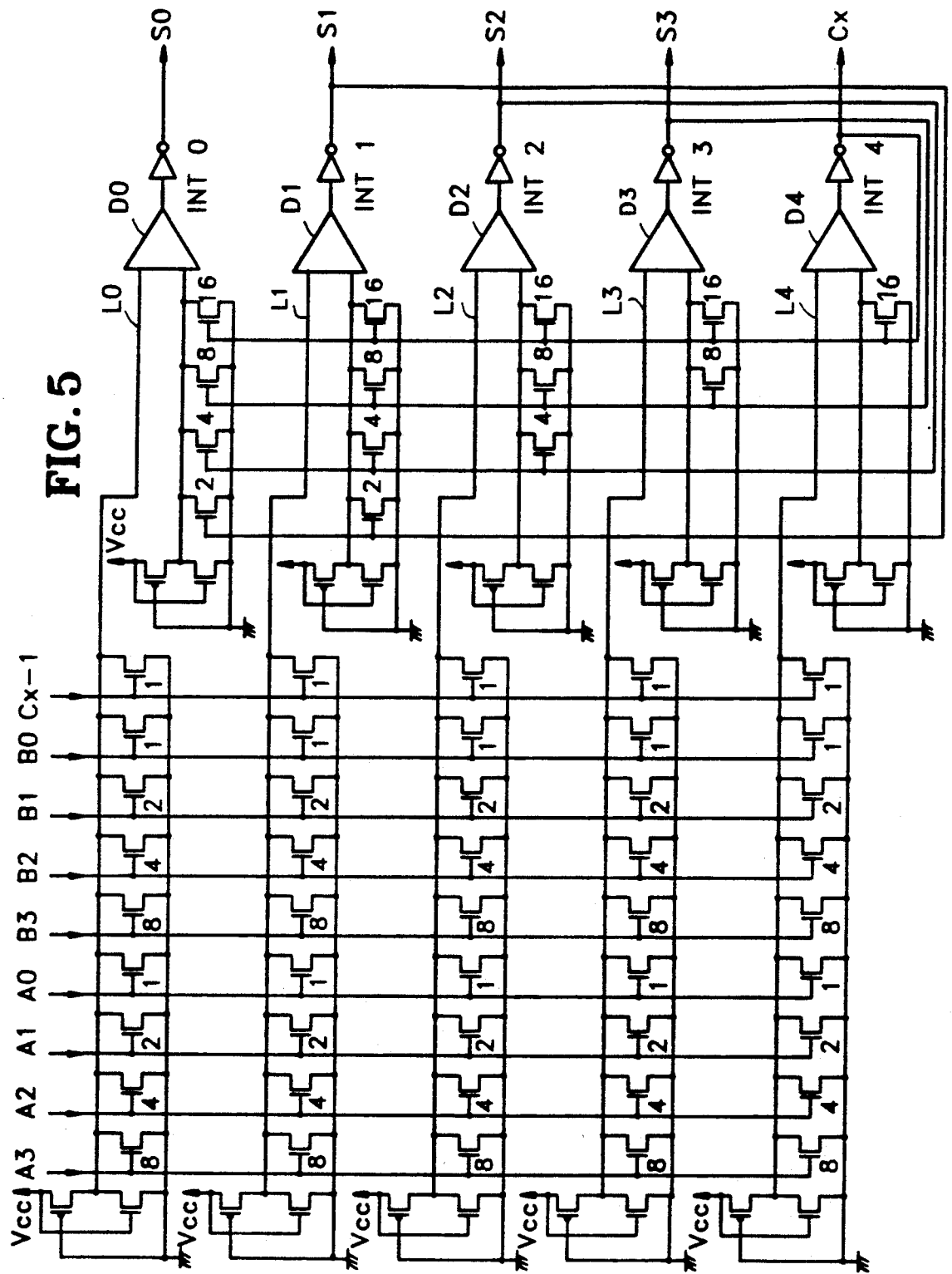
FIG. 5 is a circuit diagram showing one embodiment of a 4-bit adder by the present invention.

FIG. 4 and FIG. 5 are circuit diagrams showing, respectively, one embodiment of a comparing means and an adding means which are designed by using neural network concepts within the block diagram of FIG. 1 described above.

FIG. 4 is a circuit diagram showing one embodiment of a 7-bit comparator by the present invention.

As shown in FIG. 4, a comparator is composed of a part for receiving the input and a part for sending out the output in order to compare the magnitude of two 7-bit inputs of A6 to A0 and B6 to B0.

The part for sending out the output is composed of a buffer amplifier OB which serially connects two CMOS inverters in order to send out the compared and processed result of the two inputs.

In case of the input A, a first power supply voltage ($V_{DD}$) is supplied to source electrodes and each of the 7 input bits are respectively applied to gate electrodes of PMOS transistors (unnumbered) whose drain electrodes are connected to a input line of the buffer amplifier OB through the inverters.

In case of the input B, a second power supply voltage (ground potential) is supplied to source electrodes and each of the 7 input bits is respectively applied to the gate electrodes of NMOS transistors whose drain electrodes are connected to the input line of the buffer amplifier OB.

The PMOS transistors applying the input A act as the invert input synapse, and the NMOS transistors applying the input B act as the non-invert input synapse.

The connecting strength of the input synapses are determined by adjusting the geometrical aspect ratio (W/L) of the MOS transistors.

In the case where the two inputs A and B are equal, the output is "High" because of enlarging the conductance ratio of PMOS transistor with adjusting the value of W/L.

In other words, if the input A is greater than or equal to the input B, the output becomes "High", and, if the input A is less than the input B, the output becomes "Low".

Also, because the input bits represent the respectively different digits, the digits are represented by making the relative weight of PMOS and NMOS transistors become 64, 32, 16, 8, 4, 2, 1.

FIG. 5 is a circuit diagram showing one embodiment of a 4-bit adder by the present invention.

As shown in FIG. 5, an adder is a circuit of three inputs, that is, an augend, an addend, and a carry and two outputs, that is, a sum and a carry, and comprises a part for receiving the input and a part for sending out the output, and a feedback part for feeding the output into the front terminal.

To send out the sum output of the adding process result of two 4-bit inputs A3 to A0, and B3 to B0 and 1-bit carry input $C_{x-1}$, the part for sending out the output consists of differential amplifiers D3 to D0 of as many numbers corresponding to each output bit S3, S2, S1, and S0; a differential amplifier D4 for sending out the carry generated as the result of the adding process; and CMOS inverters INT4 to INT0 for inverting the output of the respective differential amplifiers.

The augend A in the part for receiving the input consists of 4-bit and each bit A3, A2, A1, and A0 of the augend A is commonly applied to gate electrodes of NMOS transistors whose drain electrodes are respectively connected to the first input lines L4, L3, L2, L1, and L0 of the respective differential amplifiers D4, D3, D2, D1 and D0 and also a second power supply voltage (ground potential) is spplied to source electrodes of NMOS transistors.

The addend B consists of 4-bit, and each bit B3, B2, B1 and B0 of the addend B is commonly applied to gate electrodes of NMOS transistors whose drain electrodes are respectively connected to the first input lines L4, L3, L2, L1 and L0 of the respective differential amplifiers D4, D3, D2, D1 and D0 and also a second power supply voltage (ground potential) is supplied to source electrodes of NMOS transistors.

The 1-bit carry input $C_{x-1}$, is commonly applied to gate electrodes of NMOS transistors whose drain electrodes are respectively connected to the first input lines L4, L3, L2, L1 and L0 of the respective differential amplifiers D4, D3, D2, D1 and D0, and also a second power supply voltage (ground potential) is applied to source electrodes of NMOS transistors.

Also, in order to bias the input side of the differential amplifiers, a first power supply voltage($V_{DD}$) is supplied to gate electrodes of NMOS transistors whose drain electrodes are respectively connected to the first input lines L4, L3, L2, L1 and L0 of the respective differential amplifiers D4, D3, D2, D1 and D0, and a second power supply voltage (ground potential) is supplied to source electrodes of the NMOS transistors, and also a second power supply voltage (ground potential) is supplied to gate electrodes of PMOS transistors whose drain electrodes are respectively connected to the first input lines L4, L3, L2, L1 and L0 of the respective differential amplifiers D4, D3, D2, D1 and D0 and the first power supply voltage ($V_{DD}$) is supplied to source electrodes of PMOS transistors.

The NMOS transistors applying the augend A, the addend B and the carry $C_{x-1}$ act as the input synapses, and the connecting strength of the input synapses is determined as 1 for the conductance value of the carry input and as 8, 4, 2, 1 corresponding to the weight of each input bit for the conductance value of the augend and the addend input by adjusting the geometrical aspect ratio W/L of NMOS transistors.

Also, the NMOS transistors and the PMOS transistors applying the first power supply voltage ($V_{DD}$) and the second power supply voltage (ground potential) act as a first bias synapse, and the conductance value of the synapse has 62, namely, a multiple of the connecting strength sum of the input synapses connected to the first input lines of the respective differential amplifiers.

The constitution of the feedback pact feeding the output to the front terminal is described as following.

The inverting output of the differential amplifier D4 for generating the carry is applied to gate electrodes of NMOS transistors whose drain electrodes are connected to each second input line of the differential amplifiers D3 to D0 for the sum output, and source electrodes are supplied with a second power supply voltage (ground potential).

In this like manner, the inverting outputs of the upper bit differential amplifiers D3 to D1 among the sum output differential amplifiers are applied to gate electrodes of NMOS transistors whose drain electrodes are connected to each second input line of the lower bit differential amplifiers D2 to D0, and source electrodes are supplied with a second power supply voltage (ground potential).

Also, in order to bias the input side which is fed and inputted to the differential amplifiers D4 to D0, a second power supply voltage (ground potential) is applied to source electrodes of NMOS transistors and a first power supply voltage ($V_{DD}$) is applied to gate electrodes of NMOS transistors whose drain electrodes are connected to the second input lines of the respective differential amplifier D4, D3, D2, D1 and D0, and also a first power supply voltage ($V_{DD}$) is applied to source electrodes of PMOS transistors and a second power supply voltage (ground potential) is applied to gate electrodes of PMOS transistors whose drain electrodes are connected to the second input lines of the respective differential amplifier D4, D3, D2, D1 and D0.

The NMOS transistors applying the inverting output of the carry generating differential amplifier D4 and the inverting output of the upper bit differential amplifiers D3 to D1 among the sum output differential amplifiers, are acted as the feedback synapses and the connecting strength of the feedback synapses has the value of 16, 8, 4 and 2 corresponding to the weight of the upper bit fedback.

Also, the NMOS transistors and the PMOS transistors applying a first power supply voltage ($V_{DD}$) and a second power supply voltage, that is (ground potential) are acted as a second bias synapse, and the conductance of the synapse has the value of 61.5 subtracting 0.5 from the connecting strength of the first bias synapse for the least significant bit line among the second input lines and the values of 60.5, 58.5, 54.5 and 46.5 subtracting the weight of the bits of 1, 2, 4 and 8 from the bias connecting strength of the respective lower bit lines for the other lines.

The operation of the 4-bit adder described above is described as follows.

For example, if the input of the augend A, that is, A3, A2, A1 and A0 is 0, 0, 0 and 1, the input of the addend B, that is, B3, B2, B1 and B0 is 0, 0, 1 and 1 and the input of the carry $C_{x-1}$ is 0, the sum of the connecting strength of NMOS transistors being the input synapse part of the first input lines L4, L3, L2, L1 and L0 of the differential amplifiers D4 to D0 becomes 4, and the connecting strength of the first bias synapse becomes 62.

Therefore, the input value of the carry generating differential amplifier D4 becomes VB>VA so that the output of the differential amplifier D4 becomes "High" state, and this potential is inverted through an inverter INT4 so that the value of 0 is outputted.

Also, the output of the inverter INT4 is fedback to the second input lines of the lower bit differential amplifiers D3 to D0 so that NMOS transistors are turned off by the "low" output state of the inverter INT4.

Therefore, the input value of the differential amplifier D3 becomes VB>VA so that the output of the differential amplifier D3 becomes "High" state and this potential is inverted through an inverter INT3 so that the value of 0 is outputted.

Also, the output of the inverter INT3 is fedback to the second input lines of the lower bit amplifiers D2 to D0 so that NMOS transistors are turned off by the "low" output state of the inverter INT3.

Therefore, the input value of the differential amplifier D2 becomes VB<VA so that the output of the differential amplifier D2 becomes "Low" state, and this potential is inverted through an inverter INT2 so that the value of 1 is outputted.

Also, the output of the inverter INT2 is fedback to the second input lines of the lower bit amplifiers D1 and D0 so that NMOS transistors are turned on by the "high" output state of the inverter INT2.

Therefore, the input value of the differential amplifier D1 becomes VB>VA so that the output of the differential amplifier D1 becomes "High" state, and this potential is inverted through an inverter INT1 so that the value of 0 is outputted.

Also, the output of the inverter INT1 is fedback to the second input line of the lower bit amplifier D0 so that NMOS transistor is turned off by the "low" output state of the inverter INT1.

Therefore, the input value of the differential amplifier D0 becomes VB>VA so that the output of the differential amplifier D0 becomes "High" state, and this potential is inverted through an inverter INT0 so that the value of 0 is outputted.

As described as the above, if the input of the augend A3, A2, A1 and A0 is 0, 0, 0 and 1, the input of the addend B3, B2, B1 and B0 is 0, 0, 1 and 1 and the input of the carry $C_{x-1}$ is 0, the sum output of the adder S3, S2, S1 and S0 becomes 0, 1, 0 and 0 and the output of the carry Cx becomes 0.

In this like principle, it can be known that the present invention is operated as an adder by inputting the values of all cases into three input terminals (the augend A, the addend B and the carry $C_{x-1}$).

Also, in case of enlarging the number of the input bit of the augend and the addend, an adder is designed in the form of connecting the carry output of an adder to the carry input of the next adder.

Also, in case of designing a subtractor circuit, the subtractor circuit can be designed by consist of an adder circuit and inverters which are connected to the addend input and the carry input of the adder circuit.

In the present invention described above, an adder of the highly fast floating point type can be obtained by designing a controlling circuit, which can process the signs of the exponent and the mantissa, is designed by using the comparator, and an operating circuit using an adder and a subtractor which are designed by the concept of neural network.

What is claimed is:

1. A floating point adder circuit using neural network which adds two binary numbers of K(M+N) bit that consist of an M-bit exponent part and an N-bit mantissa part comprising;

a comparator for comparing the exponent magnitude of said two binary numbers by comprising first input synapses for connecting a first power supply voltage to a line as the connecting strength of the weight of each bit according to a first exponent value of said M-bit; second input synapses for connecting a second power supply voltage to said line as the connecting strength of the weight of each bit according to a second exponent value of said M-bit; and a neuron which is stimulated or restrained according to the difference of the connecting strength between said first power supply voltage and said second power supply voltage that are connected to said line;

an adder which add the mantissa parts of said two binary numbers by comprising input synapses for respectively connecting said second power supply voltage to a first line of N+1 numbers as the connecting strength of the weight of each bit according to a first mantissa value of said N-bit, a second mantissa value of said N-bit and a carry input of one-bit; first bias synapses for connecting said first power supply voltage to each first line as the connecting strength of a multiple of said input connecting strength sum; feedback synapses for connecting said second power supply voltage to a second line of N+1 numbers of each lower output bit as the connecting strength of the weight of upper output bit; second bias synapses for connecting said first power supply voltage to the least significant bit line among said second lines as the connecting strength which subtracts 0.5 from the connecting strength of said first bias synapse and to the other lines as the connecting strength which subtracts the weight of the bit from the connecting strength of each lower bit line, in order to bias said each second line connected to said feedback synapses; neurons which are stimulated or restrained by comparing the difference of the connecting strength of said first power supply voltage and said second power supply voltage which are respectively connected to said first line and said second line; and inverters for inverting the output of each of said neurons; and a subtractor comprising said adder and inverters for inverting some mantissa value of said N-bit and said carry input.

2. The floating point adder circuit using neural network as claimed in claim 1, wherein said neuron of said comparator is composed of two CMOS inverters which are connected in series each other.

3. The floating point adder circuit using neural network as claimed in claim 2, wherein said first input synapses and said second input synapses of said comparator are made of PMOS transistors and NMOS transistors, respectively.

4. The floating point adder circuit using neural network as claimed in claim 3, wherein said input synapses and said feedback synapses of said adder are composed of NMOS transistors, and each of said first and said second bias synapses is composed of the combination of PMOS transistor and NMOS transistor.

5. The floating point adder circuit using neural network as claimed in claim 4, wherein said neurons of said adder are composed of differential amplifiers.

6. The floating point adder circuit using neural network as claimed in claim 5, wherein the connecting strength of each synapse is made of the conductance value of PMOS and NMOS transistor.

7. The floating point adder circuit using neural network as claimed in claim 6, wherein said conductance value of said PMOS or NMOS transistor is determined by the geometrical aspect ratio (W/L) of MOS transistor.

* * * * *